(12) United States Patent
Sasaki et al.

(10) Patent No.: US 7,751,637 B2
(45) Date of Patent: Jul. 6, 2010

(54) METHOD AND APPARATUS FOR SYNTHESIZING DATA

(75) Inventors: Hiroshi Sasaki, Kanagawa-ken (JP); Atsumi Eiji, Kanagawa-ken (JP)

(73) Assignee: Nokia Corporation, Espoo (FI)

( * ) Notice: Subject to any disclaimer, the term of this patent is extended or adjusted under 35 U.S.C. 154(b) by 929 days.

(21) Appl. No.: 11/165,289

(22) Filed: Jun. 22, 2005

(65) Prior Publication Data

US 2005/0286779 A1 Dec. 29, 2005

(30) Foreign Application Priority Data

Jun. 25, 2004 (JP) .............................. 2004-187401

(51) Int. Cl.
 *G06K 9/36* (2006.01)
 *G06K 9/46* (2006.01)
(52) U.S. Cl. ...................... 382/246; 382/245; 382/232; 382/233
(58) Field of Classification Search ................. 382/246, 382/232
 See application file for complete search history.

(56) References Cited

U.S. PATENT DOCUMENTS

| | | | | |
|---|---|---|---|---|
| 5,267,333 A | * | 11/1993 | Aono et al. .................. | 382/166 |
| 6,181,711 B1 | * | 1/2001 | Zhang et al. ................. | 370/468 |
| 6,298,166 B1 | * | 10/2001 | Ratnakar et al. ............. | 382/248 |
| 6,556,243 B1 | * | 4/2003 | Dotsubo et al. .......... | 348/231.2 |
| 6,577,679 B1 | * | 6/2003 | Apostolopoulos ...... | 375/240.12 |
| 6,640,011 B1 | * | 10/2003 | Ichioka ....................... | 382/232 |
| 6,967,675 B1 | * | 11/2005 | Ito et al. ................... | 348/207.1 |
| 7,054,496 B2 | * | 5/2006 | Miceli et al. ................ | 382/235 |
| 7,221,395 B2 | * | 5/2007 | Kinjo ......................... | 348/239 |
| 2004/0001622 A1 | * | 1/2004 | Roylance et al. ............ | 382/166 |
| 2005/0031215 A1 | * | 2/2005 | Nomizu et al. .............. | 382/233 |

FOREIGN PATENT DOCUMENTS

| | | |
|---|---|---|
| JP | 11-8831 | 1/1999 |
| JP | 2000-221611 | 8/2000 |
| JP | 2003-157326 | 5/2003 |

OTHER PUBLICATIONS

Smith et al. "Algorithms for manipulating compressed images", IEEE Computer Graphics & Application, pp. 34-42, Sep. 1993.*

* cited by examiner

*Primary Examiner*—Samir A. Ahmed
*Assistant Examiner*—Li Liu
(74) *Attorney, Agent, or Firm*—Harrington & Smith

(57) ABSTRACT

The present invention relates to a method and apparatus for synthesizing a plurality of data that is in compressed format. According to one aspect of the present invention, there is provided a method of creating a synthesized data by synthesizing a plurality of source data that is in compressed format, the method including the steps of: extracting a portion of one of the plurality of source data; decompressing the extracted portion to create a decompressed data portion; and synthesizing two or more of the decompressed data portions derived from different ones of the source data to create a part of the synthesized data. The extracting, decompressing and synthesizing step will be repeated until the creation of the synthesized data is completed.

11 Claims, 5 Drawing Sheets

[Figure 1]
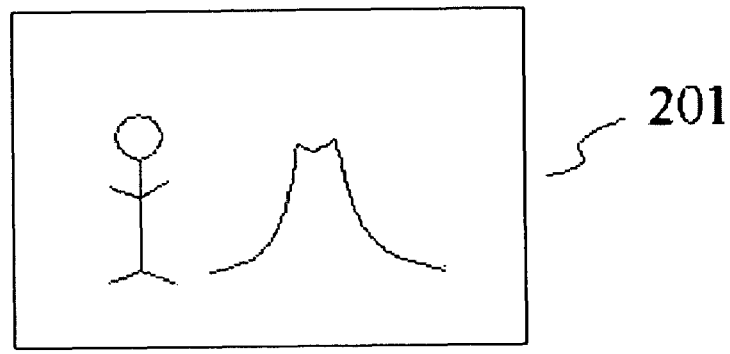
Picture
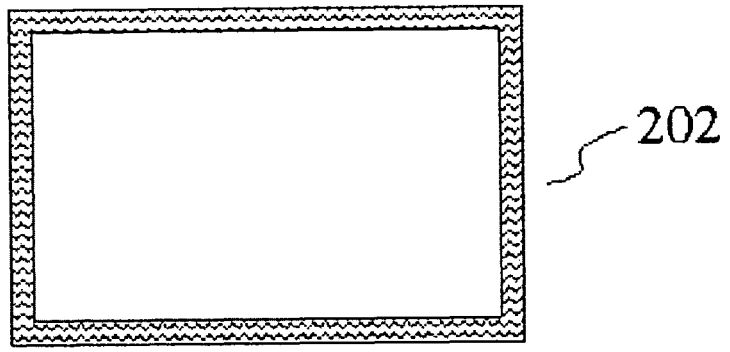
Picture Frame
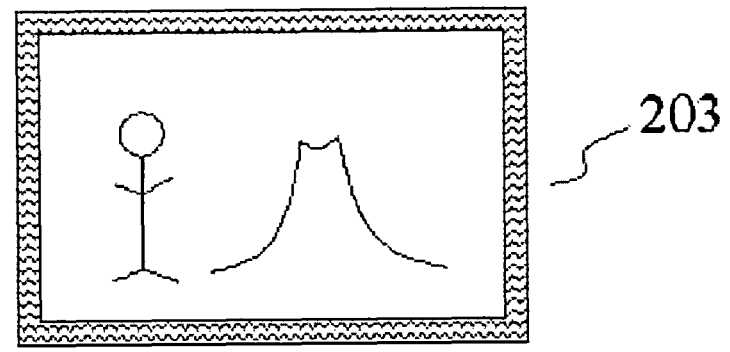
Synthesized Picture

[Figure 2]
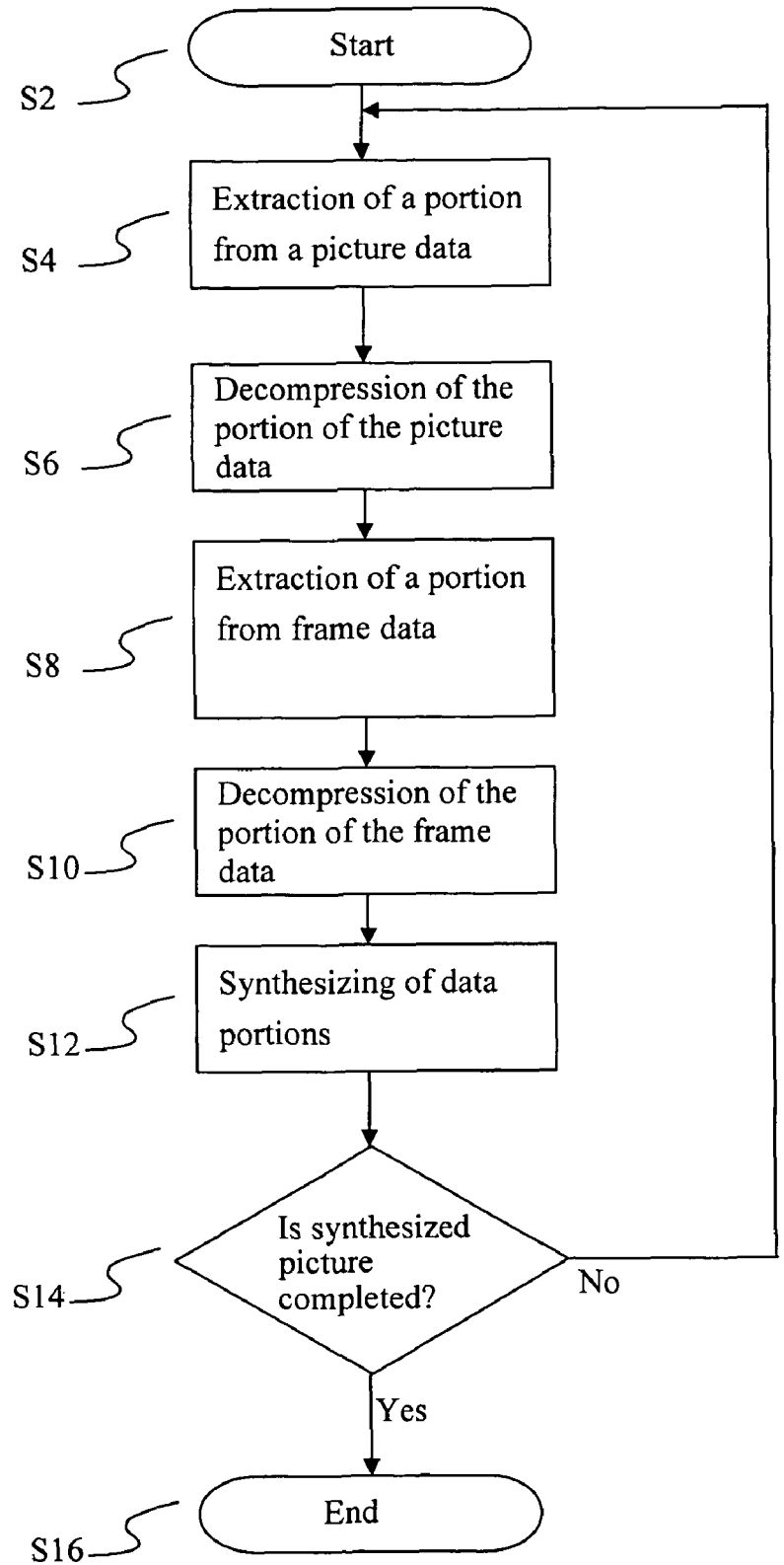

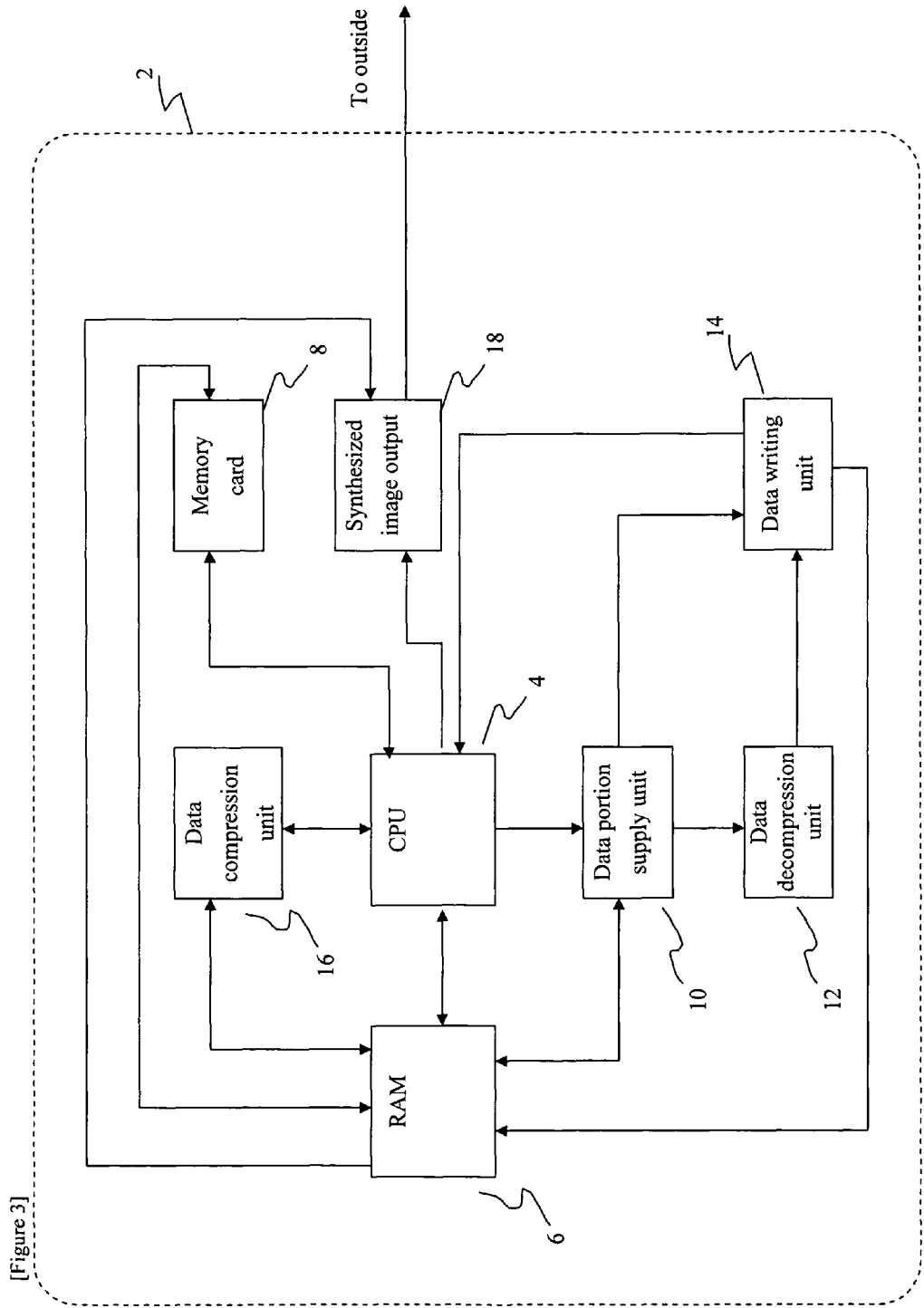
[Figure 3]

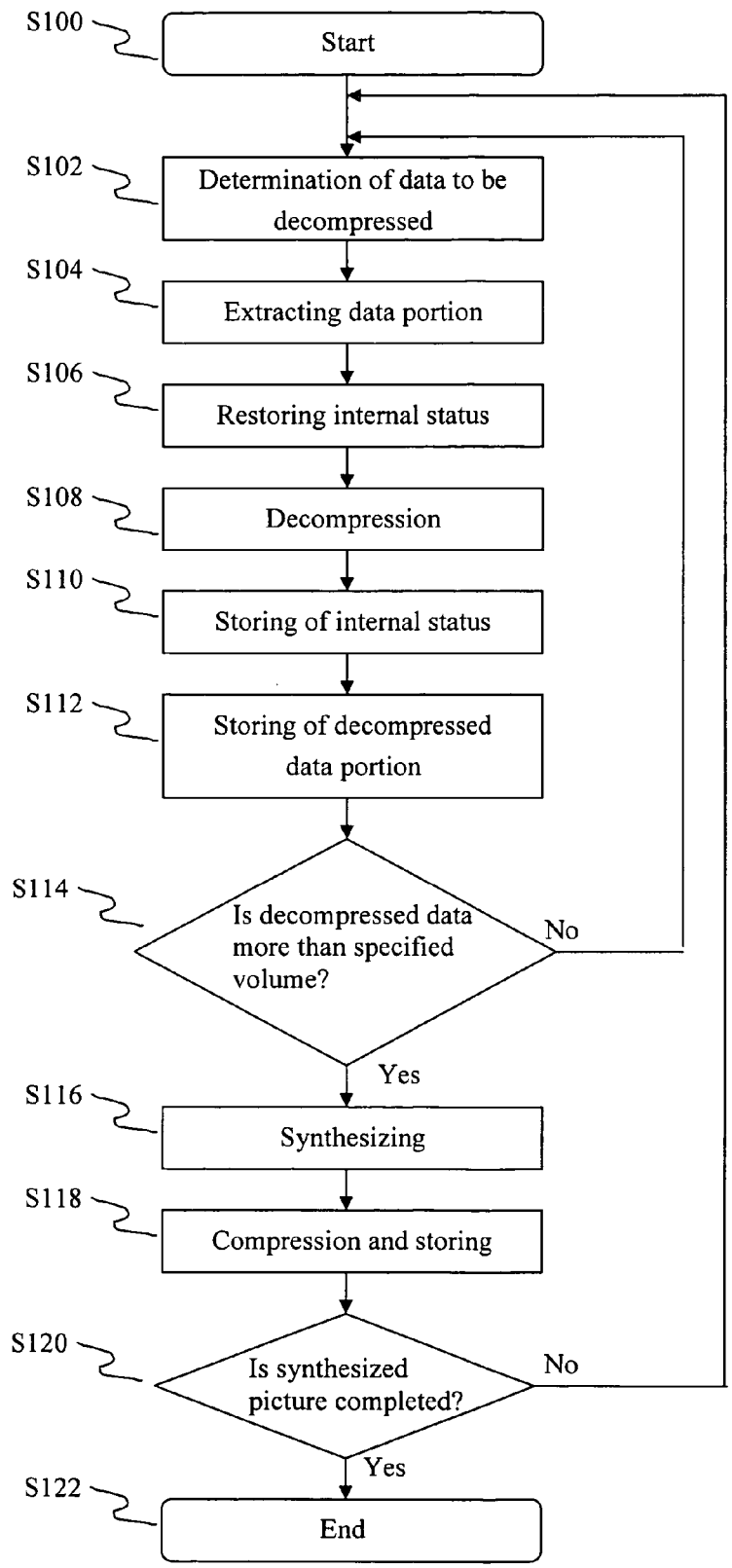
[Figure 4]

[Figure 5]
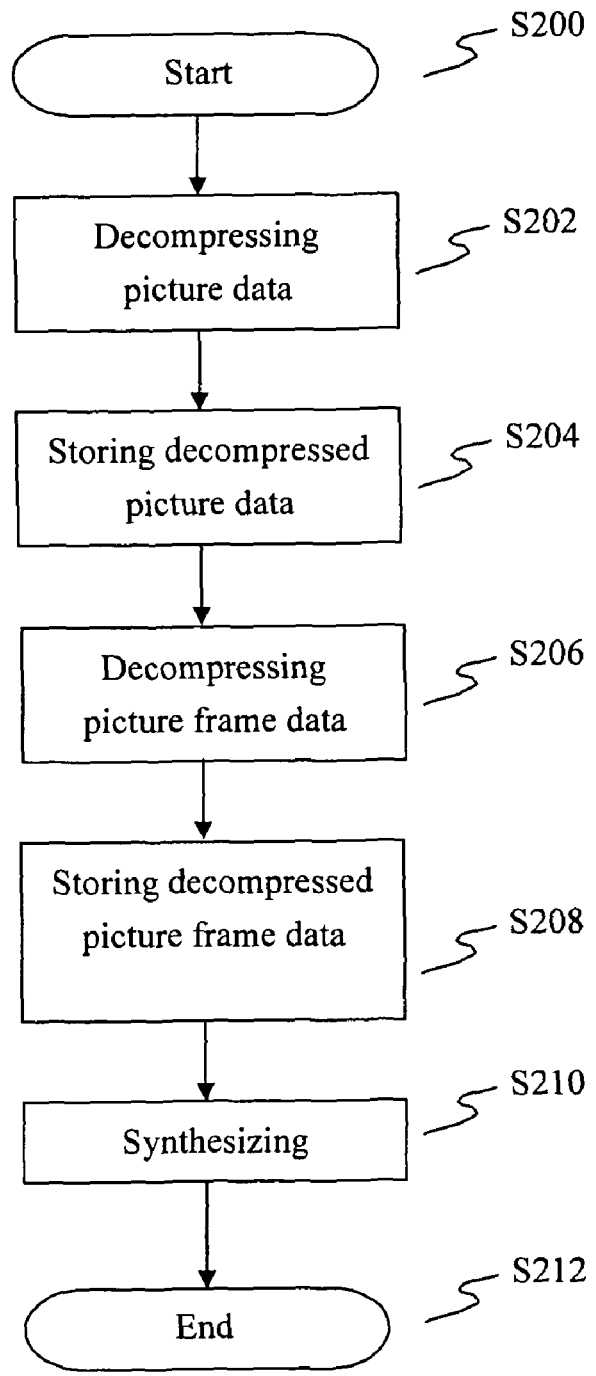

METHOD AND APPARATUS FOR SYNTHESIZING DATA

CROSS REFERENCE TO RELATED APPLICATION

This patent application claims priority to Japanese Patent Application No.: 2004-187401, filed Jun. 25, 2004.

FIELD OF THE INVENTION

The present invention relates to a method and apparatus for synthesizing a plurality of data that is in compressed format.

BACKGROUND ART

The more kinds of cellular phones with camera functions (camera phone) supplied in the market, the more applications are developed and used. Even among these applications, the direct print function (a function that enables the printing of pictures by directly connecting a camera phone and a printer) and processing and editing functions for shot pictures in particular inspire users to purchase high-end camera phones. However, since camera phones are necessarily compact enough to fit into pant pockets, and they have to implement various functions such as telephone functions or schedule functions, such advanced picture editing functions are unable to be installed. Therefore, when advanced picture editing is performed, generally, picture data is moved to a computer with superior processing ability, and editing is done on the computer.

One recent picture processing method on computers such as personal computers is a picture frame combination. As the name indicates, the picture frame combination is one which adds a frame to a picture. FIG. 1 shows an outline of the picture frame combination. In FIG. 1, 201 is a picture to which a frame is added, 202 is a picture frame, and 203 is a picture combined with the picture frame. As clearly shown in FIG. 1, picture frame 202 is added around original picture 201 in combined picture 203, adding interest to the picture. Cartoon characters or letters may be combined instead of picture frames.

A flowchart for the picture frame synthesizing process by the prior art is explained as in FIG. 5. When a synthesizing process starts (Step S200), first, the system reads out picture data to be combined and decompresses it (Step S202). The reason for decompressing picture data at this stage is because picture data shot by a digital photographic device such as a camera phone is data in compressed format, and data combination cannot be done in a compressed state. The decompressed picture data is stored in the working memory of the system (Step S204). After picture data decompression is completed, picture frame data to be combined is also decompressed and stored in the working memory (Step S206 and Step S208). Finally, the decompressed picture data and the decompressed picture frame data are combined (Step S210), and the process is finished (Step S212).

The idea of performing the above synthesizing process in a digital camera has existed since before, as shown in Japanese Unexamined Patent Application Publication H11-008831. However, in reality, performing such a synthesizing process in a digital camera or camera phone is difficult because the installed working memory runs short. For example, the data size of a picture shot by a camera with 2 megapixel resolution, which is becoming mainstream, is approximately 500-800 kilobytes. However, when these pictures are decompressed, the data size jumps up to approximately 5.5 megabytes. The data size of a picture frame with 2 megapixel resolution is very small in compressed format, but once it is decompressed, it becomes 5.5 megabytes which is same as the picture data. Therefore, in order to combine a picture with 2 megapixel resolution and a picture frame by using prior synthesizing processing methods, at least 11 megabytes of working memory is needed. Difficulties caused by this problem increase as the resolution of a camera increases. Installing a large working memory in a system raises the cost of systems and requires extra space. Consequently, in a digital camera or camera phone in which the amount of installable memory is limited, installing a function to combine a picture of some megapixels and a picture frame is difficult.

Currently, the following technology is devised as a technology to combine a picture and a picture frame stored in a digital camera. In Japanese Unexamined Patent Application Publication 2003-157326, an invention in which a picture shot by a camera phone is sent to a server on the Internet, said server synthesizing the picture with a picture frame and sending it to the camera phone again, is described. In this invention, the low processing ability of a camera phone is compensated by making a server computer with superior processing ability, combine pictures. Nevertheless, since communication lines are slow, and extra communication fees are required, as of now, pictures able to be combined by this method are limited to ones with very low resolution. This method is suitable for e-mail, but not for printing combined pictures. In order to print a picture combined with a picture frame, an invention is disclosed in Japanese Unexamined Patent Application Publication 2000-221611. In this invention, when printing by using a printer, picture data shot by a digital camera is combined with a picture frame in the printer and then printed. The picture frame combination is done by a printer with extra processing ability instead of a shooting instrument with limited processing ability.

SUMMARY OF THE INVENTION

As described above, in prior technologies, adding a function that combines a high resolution picture and a picture frame into a camera phone is difficult because of the required amount of working memory. Difficulties caused by this problem increase as the resolution of picture data is improved and its data size increases. On the other hand, in order to create combined picture data which can be used for printing such as the direct print especially demanded by users recently, the combined picture data must necessarily be in high resolution. Consequently, the object of the present invention is to provide a data synthesizing device and a data synthesizing method which solve the problem of large working memory being required for the synthesizing process of compressed data such as high resolution picture data, and enable the synthesizing process for compressed data by using only a small amount of working memory which can be installed on small electronics such as camera phones or digital cameras.

According to one aspect of the present invention, there is provided a method of creating a synthesized data by synthesizing a plurality of source data that is in compressed format, the method comprising the steps of:

extracting a portion of one of the plurality of source data;
decompressing the extracted portion to create a decompressed data portion; and
synthesizing two or more of the decompressed data portions derived from different said source data to create a part of said synthesized data, and wherein the extracting, the decompressing and the synthesizing step being repeated until the creation of said synthesized data being completed. In a preferred embodiment said method may further comprise the steps of:

storing, upon completion of decompressing the extracted data portion, an identifier identifying the source of the extracted data portion and an internal status of a decompression unit performing the decompressing step; and restoring the internal states of the decompression unit to the stored internal status if the identifier of the data portion to be decompressed matches the stored identifier.

Preferably the created part of said synthesized data is compressed in said synthesizing step.

In an embodiment, said internal status may relate to unprocessed bits that could not be decompressed among said data portions. Also, when said plurality of source data are data in JPEG format, said internal status may relate to the location of the node in a Huffman tree. Furthermore, in an embodiment, the present invention may be characterized by the following: one of said plurality of source data is picture data and another one of said plurality of source data is picture frame data.

According to an another aspect of the present invention, there is provided a data synthesizing device for creating a synthesized data by synthesizing a plurality of source data that is in compressed format, said data synthesizing device comprising:

a portion creator creating said synthesized data part by part; and a controller operating the portion creator repeatedly until the creation of said synthesized data being completed, and said portion creator further comprising:

a determining unit that determines a source data from which a data portion should be extracted among said plurality of source data;

an extracting unit that extracts a data portion of the source data determined by the determining unit;

a decompression unit that decompresses the data portion extracted by the extracting unit;

a memory unit that stores the decompressed data portion; and a synthesizing unit that creates a part of said synthesized data by synthesizing two or more of the decompressed data portion stored in the memory unit.

Said synthesizing unit may compress the created part of said synthesized data. When at least one of said plurality of source data is compressed in JPEG format, said decompression unit may comprise a Huffman decoder.

In one embodiment, the extracting unit may supply an identifier specifying the source of the extracted data portion with the extracted data portion to said decompression unit; and the decompression unit may, upon completion of decompressing the supplied data portion, store the supplied identifier with an internal status of the decompression unit at the decompression process is completed, and if a newly-supplied said identifier supplied together with a newly-supplied said data portion matches the stored identifier, the decompression unit may restore its internal states to the stored internal status and then decompresses the newly-supplied data portion. The internal status may relate to an unprocessed bit that could not be decompressed among the data portions supplied from the extracting unit. The internal status may relate to a location of a node in the Huffman tree.

In an embodiment, said extracting unit may store, if an unprocessed bit remains in said decompression unit which could not be decompressed in the decompression unit, the unprocessed bit with an identifier specifying the source of the unprocessed bit among said plurality of source data, and then supply the stored unprocessed bit to the decompression unit together with an another data portion having the same identifier as the stored identifier.

In an embodiment, one of said plurality of source data may be a picture data and another one of said plurality of source data may be a picture frame data.

In another aspect of the invention, the present invention includes a camera device or a cellular phone comprising a data synthesizing device mentioned above.

According to the present invention, the amount of required working memory to combine a plurality of compressed data can be smaller than prior art. Therefore, by using the present invention, even a small photographic device, such as a camera phone, digital camera, or imaging phone which may be difficult to have a large working memory, can synthesize high resolution picture data and a picture frame.

BRIEF DESCRIPTION OF THE DRAWINGS

FIG. 1 shows an explanatory diagram showing the outline of the picture frame combination.

FIG. 2 shows a flowchart of the picture frame combination process using the present invention.

FIG. 3 shows a block diagram of the data synthesizing device using the present invention.

FIG. 4 shows a flowchart showing the behavior of the data synthesizing device using the present invention.

FIG. 5 shows a flowchart of the picture frame combination process by prior art.

DESCRIPTION OF THE PREFERRED EMBODIMENTS

With reference to the attached figures, embodiments to implement the present invention are explained below. First of all, the process flow of the combination process, which is explained in FIG. 1, to create combined picture data 203 with synthesizing picture data 201 and picture frame data 202 by using a data synthesizing method by the present invention is explained by using a flowchart in FIG. 2. In addition, picture data 201 and picture frame data 202 are compressed picture data in JPEG format.

FIG. 2 is a flowchart showing the flow of the picture frame synthesizing process, using the present invention. Step S2 is the start of the data synthesizing process. First, data of a fairly small part of data (data portion) is extracted from picture data 201 (Step S4). Since this data portion is compressed, the extracted data portion is decompressed in the next step S6. In a similar way, a data portion is extracted from picture frame data 202 (Step S8), and the extracted data portion is decompressed (Step S10). The decompressed data portion is data in YUV or RGB format, and corresponding pixels can be combined in both formats. Step S12 does this process, creating a part of combined picture data 203 by synthesizing data portions of the decompressed picture data 201 and a data portion of the decompressed picture frame data 202. Combined picture data 203 can be completed by repeating steps Step S4 to Step S12 until all units of combined picture data 203 are completed (Step S14). More specifically, combined picture data 203 is being created in units by extracting data portions from different units of picture data 201 and picture frame data 202 and decompressing them each time the repetition of Step S14 is done, and synthesizing the decompressed data portions. Furthermore, in Step S12, a function that compresses relevant units may be added after creating a unit of combined picture data 203.

The size of a data portion extracted in Step S4 or S8 can be fairly small, for example 64 bytes or 128 bytes. Therefore, as for the volume of working memory required in the data synthesizing method by the present invention, 2-3 times the maximum size, for example, assumed for decompression of a 64-byte data portion in compressed format is enough. This is an order of several kilobytes at maximum and is extraordinarily small in comparison with the ten-odd megabytes required in existing technologies explained in the Prior Art section. According to the data synthesizing method by the present invention, the size of data portions extracted at the same time can be set to 64, 128 bytes, etc. regardless of the size of data to be combined. Consequently, the synthesizing process is possible without increasing the volume of working memory even for high resolution picture data. Because of this, a function that combines high resolution picture data and a picture frame can easily be installed even in a small photographic device, such as camera phone or digital camera, which cannot load a large working memory, by using the present invention. High resolution image data is demanded especially for printing such as direct print, but by using the present invention, a camera phone or a small digital camera can create high quality picture frame combined picture which can be used for printing.

Next, an embodiment implementing the present invention in hardware is explained. FIG. 3 is a function block diagram showing an example of a data synthesizing device, using the present invention. Data synthesizing device 2 is also an image data synthesizing device to create combined picture data 203 by synthesizing picture data 201 in JPEG format and picture frame 202 in JPEG format. Data synthesizing device 2 comprises CPU 4, RAM 6, memory card 8, data portion supply unit 10, data decompression unit 12, data writing unit 14, data compression unit 16, and combined image output unit 18. CPU 4 is a processing device, responsible for control of the entire data synthesizing device 2. In the explanation below, behavior of CPU 4 controlling components of data synthesizing device 2 is described, however, control is performed by works of CPU 4 according to software not shown in figures. RAM 6 is a primary storage device, temporary storing data processed in data synthesizing device 2. Memory card 8 is a data recording medium which is attachable and removable, and in which many picture data and picture frame data are stored. CPU 4 reads out data of picture 201 and picture frame 202 to be combined from memory card 8 and stores it in RAM 6 when it combines a picture and a picture data frame.

Data portion supply unit 10, when receiving an order from CPU 4, reads out small portions of picture data 201 or picture frame data 202 stored in RAM 6 and sends them to data decompression unit 12. The size of read-out data portion is fairly small and may be, for example, 64 or 128 bytes. Which data of picture data 201 or picture frame data 202 is read out is specified by CPU 4. In addition, data portion supply unit 10 is configured to add only the size of the read-out data portions to a read-out start address each time the data portions are read out. Therefore, data portion supply unit 10 can read out data portions which are different from the previous each time it receives a new data read-out order from CPU 4. Naturally, the addition of read-out start address is configured to be done independently for picture data 201 and picture frame data 202. Data portion supply unit 10 is configured to send an identifier that specifies the source of read-out data portions, which is either picture data 201 or picture frame data 202, to data decompression unit 12 and data writing unit 14 as well as sending read-out data portions to data decompression unit 12.

Data decompression unit 12 is equipped with a JPEG decoder, decompresses data portions supplied by data portion supply part 10 with a JPEG decoding process, and sends the expanded data portions to data writing part 14. Data writing part 14 stores the expanded data portions to RAM 6. Data writing part 14 assigns the expanded data portions into storage addresses on RAM using identifiers received from data portion supply part 10, and it makes the data portions recognizable on RAM as to whether their source is picture data 201 or picture frame data 202. Data writing part 14 is further configured to send interrupts to CPU 4 when writing data into RAM 6 to inform to CPU 4 that the expanded data portions are stored in RAM.

CPU 4 checks whether or not decompressed data portions from picture data 201 and decompressed data portions from picture frame data 202 which are stored in RAM 6 exist at more than a specified volume, and if so it combines the data. The combination process is performed among data which is equal in size. Data compression unit 16 receives an order from CPU 4, compresses synthesized data in JPEG format, and stores it to RAM 16. Combined and compressed data becomes a part of combined picture data 203.

When a part of combined picture data 203 is built, CPU 4 determines which data of picture data 201 or picture frame data 202 is read out and specifies it to data portion supply unit 10. The determination is determined by the volume of decompressed data portions stored in RAM 6. Since data portions that data portion supply unit 10 reads out are data compressed in JPEG format, even if the data size before decompression is a certain amount, the data size after decompression will differ. On the other hand, the combination process is performed among data that is equal in size. Therefore, there may be a case in which data from picture frame data 202 is left in RAM 6 even after CPU 4 performs the combination process. In this case, CPU 4 determines picture data 201 as data to be decompressed next and orders data portion supply unit 10 to read out data portions from picture data 201.

As described above, when a part of combined picture data 203 is created, CPU 4 controls data portion supply unit 10 to newly read out another data portion from picture data 201 or picture frame data 202, combines data for which read-out data is then decompressed, and creates another part of combined picture data 203. CPU 4 finally completes combined picture data 203 by the repetition of this process. The completed combined picture data 203 is stored in memory card 8 or output to the outside of data synthesizing device 2 through combined image output 18.

When picture data is data compressed in JPEG format, data decompression unit 12 may be unable to decompress all data portions supplied from data portion supply unit 10. More specifically, when the size of data portions supplied from data portion supply unit 10 is fixed, all of the data portions are not limited to support the codeword, and some bits of unprocessed bits may be left. Therefore, preferably, data decompression unit 12 is configured to support these unprocessed bits.

In an embodiment, data decompression unit 12 can be configured as follows: it stores unprocessed bits that are left after completing the decompression of data portions with an identifier that specifies the source data described above, and if, when a data portion is supplied, an identifier supplied with it matches an identifier stored previously, the stored unprocessed bits are added to the top of the new data portion, and then decompressed. Preferably, data decompression unit 12 is configured to store the location on the Huffman tree, where the relevant unprocessed bits were last researched, not to research again the codeword for which the relevant unprocessed bits were researched, and, to start the decompression process from the next location on the stored Huffman tree when the relevant unprocessed bits are decompressed with new data portions. Consequently, data decompression unit 12 is preferably configured, when completing the decompression process of each data portion, to store an identifier of the data portion and the internal status upon completion of the process (unprocessed bits, location on the Huffman tree, etc.), as well as to decompress a new data portion after restoring the internal status of data decompression unit 12 to the stored internal status when an identifier supplied with the new data portion matches the stored identifier.

In an embodiment, simple information as explained below can be used for the internal status of data decompression unit 12. As an example, it is assumed that a codeword used for picture data 201 or picture frame data 202 is something like Table 1 below.

TABLE 1

| Name | Codeword |
|---|---|
| CW1 | 10 |
| CW2 | 110 |
| CW3 | 1110 |
| CW4 | 11110 |
| CW5 | 111110 |
| --- | --- |
| --- | --- |
| --- | --- |

In other words, it is assumed that the following codeword group is used: bit column 10 (codeword) is assigned to a bit column with the highest probability of appearance, and then 110 is assigned to a bit column with the next highest probability of appearance. . . . In such case, something similar to Table 2 below can be used for the internal status.

TABLE 2

| Internal Status | Content |
|---|---|
| Status 0 | If the next bit is 0, research the JPEG internal code. If the next bit is 1, move to Status 1 |
| Status 1 | If the next bit is 0, perform output corresponding to CW1. If the next bit is 1, move to Status 2. |
| Status 2 | If the next bit is 0, perform output corresponding to CW2. If the next bit is 1, move to Status 3. |
| Status 3 | If the next bit is 0, perform output corresponding to CW3. If the next bit is 1, move to Status 4. |
| Status 4 | If the next bit is 0, perform output corresponding to CW4. If the next bit is 1, move to Status 5. |
| Status 5 | If the next bit is 0, perform output corresponding to CW5. If the next bit is 1, move to Status 6. |
| ... | ... |
| ... | ... |

In the embodiment shown in Table 2, the internal status N indicates the following status: if the next bit supplied from data portion supply unit 10 is 0, perform output corresponding the codeword N, (which means to decompress), as well as return to the initial status (the internal status 0), and if the next bit supplied from data portion supply unit 10 is 1, move the internal status to N+1. Therefore, in this embodiment, even if unprocessed bits are generated, data decompression unit 12 does not have to store unprocessed bits themselves, and it is only necessary to store the internal status and the identifier. This has the advantage of a data decompression unit 12 with a simple structure. Also, data decompression unit 12 is configured, if an identifier that matches an identifier stored from data portion supply unit 10 is supplied, to research whether the first bit of a newly supplied data portion is 0 or 1 after restoring the internal status of data decompression unit 12 to a relevant stored internal status.

An embodiment that leaves handling of unprocessed bits generated in data decompression unit 12 to data portion supply unit 10 is also possible. For example, the following configuration is possible. First, a counter is built on data portion supply unit 10, and each time one bit of a data portion is supplied to data decompression unit 12, it is monitored whether there is an output of data decompressed from data decompression unit 12, and the number of no outputs with the counter are counted as well. If there is an output, the value of the counter is returned to the initial status 0. However, if the value of the counter is not 0 when all of a data portion is supplied, it is determined that unprocessed data with the same number of bits as the value in data decompression unit 12 has been generated, and the same volume of bit data is stored. Consequently, data portion supply unit 10 is required to have storing means to store some bit data even after supplying all of a data portion to data decompression unit 12. Then, when data portion with the same identifier as said data portion is supplied to data decompression unit 12, data from the stored bit data first to data decompression unit 12 is supplied again.

Behavior of data synthesizing device 2 is explained by using FIG. 4. Step S100 is a start of operations to create combined picture data 203 by synthesizing picture data 201 and picture frame data 202. In Step S102, CPU 4 determines which data of picture data 201 and picture frame data 202 is to be decompressed. In Step S104, data portion supply unit 10 reads out a small part (data portion) of data determined in Step S104 by receiving instructions from CPU 4, and the read-out data portion is supplied to data decompression unit 12 with an identifier that specifies the source data of data of said data portion from either picture data 201 or picture frame data 202. In Step S106, data decompression unit 12 restores the internal status stored while being associated with the same identifier as an identifier supplied in Step S104. When no internal status is stored, the internal status of data decompression unit 12 is initialized. In Step S108, data decompression unit 12 decompresses data portions supplied from data portion supply unit 10 in Step S104.

In Step S110, the internal status of data decompression unit 12 upon completion of decompression of data portions is stored. The internal status in Steps S106 or S110 is the one related to unprocessed bits of said data portions or a location of a node in the Huffman tree. In Step S112, decompressed data portions are stored in RAM 6. In Step S114, CPU 4 checks whether or not data portions already decompressed are more than a specified volume, and if so combines them in Step S116. Most simply, if both of data portions of decompressed picture data 201 and data portions of picture frame data 202 are more than 1 block, it can be determined to combine them both. However, it may be configured in such a way that they are not combined unless they are both more than 16 blocks. If either of data from picture data 201 or data from picture frame data 202, which is stored in RAM 6, does not meet a specified volume, CPU 4 sends instructions to data portion supply unit 10 to control the reading out of data portions from whichever data is less decompressed.

When decompressed data is stored in more than a specified volume in RAM 6, move to Step S116, and CPU 4 combines data portions of picture data 201 and picture frame data 202 to create a part of combined image data 203. The data of the created relevant unit is compressed in JPEG format in data compression unit 16 and stored in RAM 6 (Step S118). In Step S120, CPU 4 determines whether or not combined picture data 203 is completed, and if not, returns to Step S102, CPU 4 sends instructions to data portion supply unit 10, and a sequence of read-out/decompression/combination of new data portions is repeated. By repeating Steps S102 through S120, combined picture data 203 is completed. When combined picture data 203 is completed, the process is finished (Step S122).

The volume of data decompressed in data decompression unit 12 varies from each data portion because a data portion is compressed data. Therefore, the following situation may occur: even if the size of a data portion supplied by data portion supply unit 10 is fixed to, for example, 64 bytes, decompressing the data portion from picture data 201 makes it only 300 bytes, but decompressing the data portion from picture frame data 202 makes it 1200 bytes. Even after CPU 4 combines decompressed data in Step S116, 900 bytes of decompressed data from picture frame data 202 is left without being combined. Because of this, when returning to Step S102, CPU 4 sends instructions to data portion supply unit 10 to read out data portion from the picture data 201 or picture frame data 202, whichever data has less decompressed data.

A data synthesizing device by the present invention requires only a slight volume of working memory even when performing the combination of a picture frame and high resolution picture data. Therefore, a data synthesizing device by the present invention can be installed without extra effort in a small photographic device, such as a camera phone or digital camera, which cannot load a large working memory. Since these small photographic devices normally load CPU, RAM, or a memory card, the CPU and RAM can be shared with CPU 4, RAM 6, and memory card 8 in FIG. 2. In addition, function blocks of data segment supply unit 10, data decompression unit 12, data writing unit 14, and data compression unit 16 in FIG. 3 preferably consist of hardware from a process speed perspective, but all may be realized by software. If these functions are all realized by software, it is an advantage that the present invention can be installed without changing hardware of current camera phones or digital cameras. Some recent camera phones and digital cameras are equipped with wired connection means such as USB or wireless connection means such as infrared rays/Bluetooth/wireless LAN, and can print pictures by directly connecting to a printer. Consequently, by sharing combined image output unit 18 in FIG. 3 with the wired connection means or wireless connection means and outputting created combined picture data 203 through combined image output unit 18 and formatting it in a standard data format such as DCF or Exif, high resolution picture frame combined pictures created by the present invention can be directly printed by a printer.

The present invention has been explained with examples of methods and devices that combine picture data and picture frame data, but clearly, the application range of the present invention is not limited to this application. For example, two image data in compressed format are combined in the embodiment above, but it is easily understood that the present invention is applicable even when two or more data in compressed format are combined. In addition, the present invention has been developed to enable the combination of a plurality of data in compressed format with only a slight volume of working memory, but it is clear from all purposes of the specifications for those skilled in the art that the developed data synthesizing method is not only for use in an environment with a low volume of working memory installed but can also be used as a general data synthesizing algorithm applicable in various environments.

What is claimed is:

1. A method of creating synthesized data by synthesizing a plurality of source data that is in compressed format, comprising:
    extracting, by an apparatus, portions of the plurality of source data;
    decompressing, by the apparatus, the extracted portions to create decompressed data portions, wherein elements of the decompressed data portions directly express values of red-green-blue (RGB) or luminance-chrominance-chrominance (YUV) format;
    synthesizing, by the apparatus, two or more of the decompressed data portions derived from different ones of the plurality of source data to create a part of said synthesized data;
    compressing, by the apparatus, said created part of the synthesized data, wherein the extracting, the decompressing, the synthesizing, and compressing are repeated until the creation of said synthesized data is completed;
    storing, upon completion of decompressing the extracted data portions, an identifier identifying sources of the extracted portions and an internal status of a decompression unit performing the decompressing step; and
    restoring a current internal status of the decompression unit to the stored internal status if an identifier of further data portions to be decompressed matches the stored identifier, wherein the stored internal status is related with a codeword of a Huffman tree which was used at the end of the decompressing step.

2. A method according to claim 1, wherein the codeword is a codeword N and wherein the stored internal status is associated with an operation in which if a next bit of the extracted portion is 0, perform an output corresponding to the codeword N and return to an initial status of the stored internal status; and if the next bit of the extracted portion is 1, move the stored internal status to N+1; where N is an integer larger than 1.

3. A method according to claim 1, wherein one of said plurality of source data is a picture data and another one of said plurality of source data is a picture frame data.

4. A method of creating synthesized data by synthesizing a plurality of source data that is in compressed format, comprising:
    extracting, by an apparatus, portions of the plurality of source data;
    decompressing, by the apparatus, the extracted portions to create decompressed data portions, wherein elements of the decompressed data portions directly express values of red-green-blue (RGB) or luminance-chrominance-chrominance (YUV) format:
    synthesizing, by the apparatus, two or more of the decompressed data portions derived from different ones of the plurality of source data to create a part of said synthesized data;
    compressing, by the apparatus, said created part of the synthesized data, wherein the extracting, the decompressing, the synthesizing, and compressing are repeated until the creation of said synthesized data is completed;
    storing, upon completion of decompressing the extracted data portions, an identifier identifying sources of the extracted portions and an unprocessed bit that could not be decompressed among the extracted portions; and
    if an identifier of further data portions to be decompressed is the same as the stored identifier, performing decompression for a bit group including the stored unprocessed bit.

5. An apparatus for creating synthesized data by synthesizing a plurality of source data that is in compressed format, comprising:
- a portion creator configured to create said synthesized data part by part by synthesizing the plurality of source data; and
- a controller configured to operate the portion creator repeatedly until the creation of said synthesized data is completed;

said portion creator further comprising:
- a determining unit configured to determine source data from among the plurality of source data from which individual data portions are to be extracted;
- an extracting unit configured to extract the data portions from the source data determined by the determining unit;
- a decompression unit configured to decompress the extracted data portions, wherein elements of decompressed data portion directly express values of red-green-blue (RGB) or luminance-chrominance-chrominance (YUV) format;
- a memory unit configured to store the decompressed data portions; and
- a synthesizing unit configured to create a part of said synthesized data by synthesizing two or more of the decompressed data portions stored in the memory unit, wherein said synthesizing unit compresses the created part of said synthesized data;
- wherein said extracting unit is arranged to supply an identifier specifying the source of the extracted data portions together with the extracted data portions to said decompression unit; and
- wherein said decompression unit is arranged to store, upon completion of decompressing the supplied data portions, the supplied identifier and an internal status of the decompression unit, and to restore, if a newly-supplied identifier supplied together with newly-supplied data portions matches the stored identifier, a current internal status of the decompression unit to the stored internal status and then to decompress the newly-supplied data portions, wherein the stored internal status is related with a codeword of a Huffman tree which was used at the end of the decompression operation.

6. An apparatus according to claim 5, wherein the codeword is a codeword N and wherein the stored internal status is associated with an operation in which if a next bit of the extracted portion is 0, perform an output corresponding to the codeword N and return to an initial status of the stored internal status; and if the next bit of the extracted portion is 1, move the stored internal status to N+1; where N is an integer larger than 1.

7. An apparatus according to claim 5, wherein said internal status also relates to an unprocessed bit that could not be decompressed among the data portions supplied from said extracting unit.

8. An apparatus according to claim 5, wherein one of said plurality of source data is picture data and another one of said plurality of source data is picture frame data.

9. An apparatus according to claim 5, wherein the apparatus comprises a camera device.

10. An apparatus according to claim 5, wherein the apparatus comprises a cellular phone.

11. An apparatus for creating synthesized data by synthesizing a plurality of source data that is in compressed format, comprising:
- a portion creator configured to create said synthesized data part by part by synthesizing the plurality of source data; and
- a controller configured to operate the portion creator repeatedly until the creation of said synthesized data is completed;

said portion creator further comprising:
- a determining unit configured to determine source data from among the plurality of source data from which individual data portions are to be extracted;
- an extracting unit configured to extract the data portions from the source data determined by the determining unit;
- a decompression unit configured to decompress the extracted data portions, wherein elements of decompressed data portion directly express values of red-green-blue (RGB) or luminance-chrominance-chrominance (YUV) format;
- a memory unit configured to store the decompressed data portions; and
- a synthesizing unit configured to create a part of said synthesized data by synthesizing two or more of the decompressed data portions stored in the memory unit, wherein said synthesizing unit compresses the created part of said synthesized data;
- wherein said extracting unit is configured to store, if an unprocessed bit remains in said decompression unit which could not be decompressed in the decompression unit, the unprocessed bit with an identifier specifying the source of the unprocessed bit among said plurality of source data, and then to supply the stored unprocessed bit to the decompression unit together with data portions having the same identifier as the stored identifier.

* * * * *